(No Model.)
S. B. GOFF.
ROTARY ENGINE OR WATER WHEEL.
No. 433,727. Patented Aug. 5, 1890.
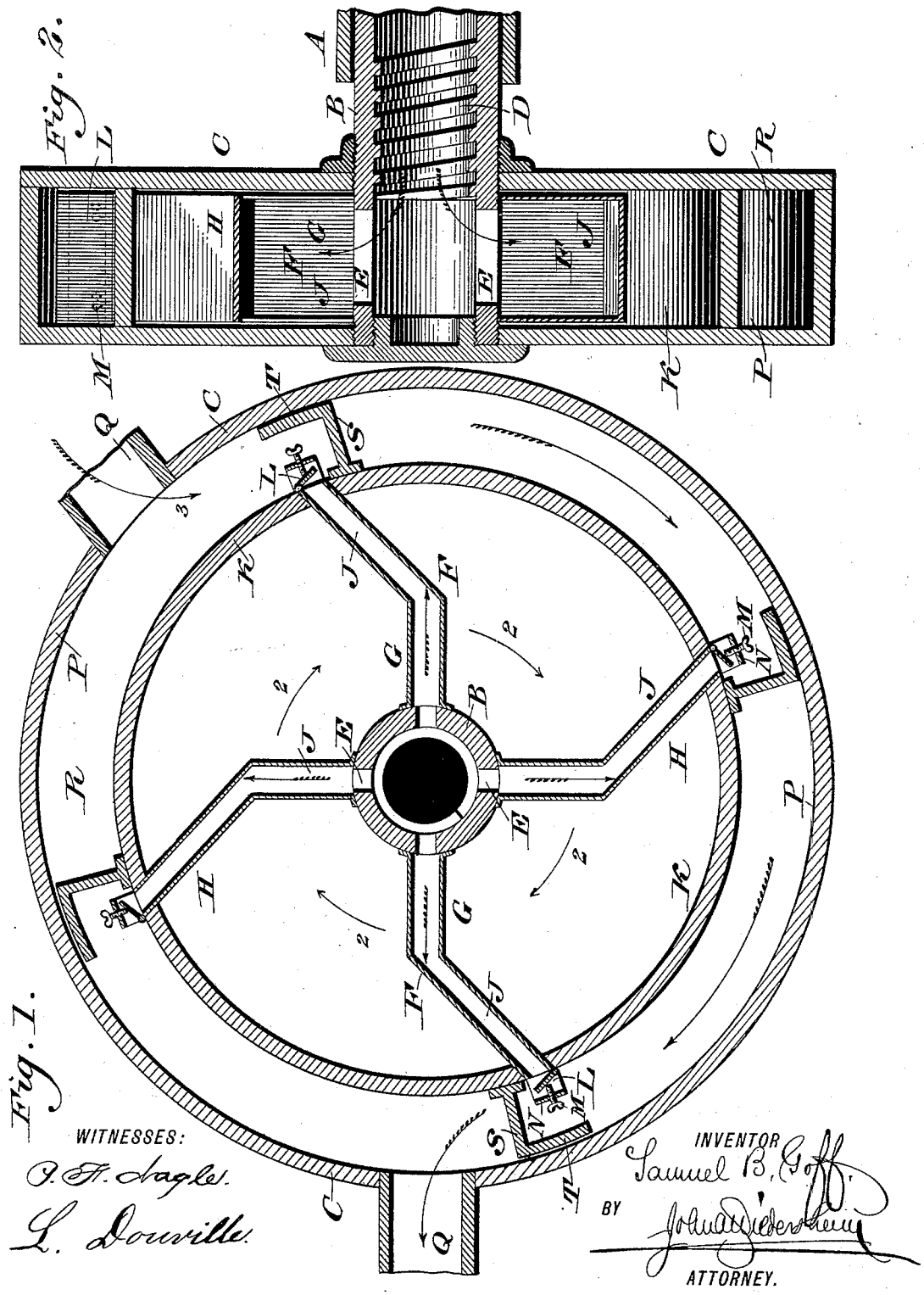

UNITED STATES PATENT OFFICE.

SAMUEL B. GOFF, OF CAMDEN, NEW JERSEY.

ROTARY ENGINE OR WATER-WHEEL.

SPECIFICATION forming part of Letters Patent No. 433,727, dated August 5, 1890.

Application filed March 13, 1890. Serial No. 343,722. (No model.)

*To all whom it may concern:*

Be it known that I, SAMUEL B. GOFF, a citizen of the United States, residing in the city and county of Camden, State of New Jersey, have invented a new and useful Improvement in Rotary Engines or Water-Wheels, which improvement is fully set forth in the following specification and accompanying drawings.

My invention relates to improvements in water-wheels; and it consists of the combination of parts herein set forth.

Figure 1 represents a vertical section of a water-wheel embodying my invention. Fig. 2 represents a transverse sectional view of the device shown in section in Fig. 1.

Similar letters of reference indicate corresponding parts in the two figures.

Referring to the drawings, A designates a pipe, which is attached to a steam-chest, boiler, or other suitable source of steam-supply, and forming a bearing for the shaft B of the wheel C. The said shaft B is adapted to freely rotate in the pipe A, and has an interior spirally-formed passage D, leading from the said pipe A to a number of openings E in the periphery of the said shaft. Secured to the said shaft, which forms the hub of the wheel, are bent or angular spokes or arms F, having a radial portion G and a bent portion H, the said arms having passages J therein, leading from the openings E to the outside of the rim K of the wheel. To control the flow of the steam through the passage J, a valve L is provided, the said valve being at the rim and being adjusted by means of the screw M, which is movable in the angular arm N, secured to the said rim. A casing or shell P, having openings Q for the outlet of the exhaust-steam, surrounds the wheel C, an intervening space R being between the said wheel and casing. Secured to the rim K are angular arms S, the outer limbs T of which form close joints between the casing P and the said rim K.

The operation is as follows: Steam passing through the pipe A into the spiral passage of the shaft B rotates the same, and passing out of the openings E into the passages J of the arms F bears against a wall of the bent portion H thereof, so that the wheel is driven in the direction of the arrow 2, Fig. 1.

In place of steam, water might be forced into the pipe A and thereby operate the wheel.

Having thus described my invention, what I claim as new, and desire to secure by Letters Patent, is—

1. A water-wheel having a shaft with an inner spiral passage, angular spokes or arms secured to said shaft and having passages communicating with said inner spiral passage, and valves at the outlet of said passages of the spokes, said parts being combined substantially as described.

2. A water-wheel having a shaft with an inner spiral passage, angular spokes or arms on said shaft and having inner longitudinal passages, a rim connected with the outer end of the said spokes, valves at the outlet of the passages of the spokes, a casing inclosing the wheel and having openings therein, and angular or flanged arms secured to the said rim and forming a close joint with the casing, said parts being combined substantially as described.

3. A water-wheel consisting of a hollow shaft having a spiral passage-way therein and provided with peripheral openings, hollow arms secured to said shaft and having a radial and a bent portion, a rim secured to said arms, adjustable valves controlling the outlet of the passages in said arms, angular or flanged arms secured to the rim, and a casing with openings, said parts being combined substantially as described.

SAMUEL B. GOFF.

Witnesses:
JOHN A. WIEDERSHEIM,
A. P. JENNINGS.